US006977590B2

(12) United States Patent
Bennett

(10) Patent No.: US 6,977,590 B2
(45) Date of Patent: Dec. 20, 2005

(54) METHOD OF AUTOMATICALLY MONITORING AND NEUTRALIZING HAZARDOUS MATERIAL SPILLS

(76) Inventor: Joseph Michael Bennett, 2325 Nashville Pike, Apt. 916, Gallatin, TN (US) 37066

( * ) Notice: Subject to any disclaimer, the term of this patent is extended or adjusted under 35 U.S.C. 154(b) by 152 days.

(21) Appl. No.: 10/620,257

(22) Filed: Jul. 15, 2003

(65) Prior Publication Data
US 2004/0075565 A1 Apr. 22, 2004

Related U.S. Application Data

(60) Provisional application No. 60/395,899, filed on Jul. 15, 2002.

(51) Int. Cl.[7] ............................................. G08B 21/00
(52) U.S. Cl. ................... 340/605; 340/539.26
(58) Field of Search .............................. 340/605, 591, 340/632, 626, 539.26

(56) References Cited

U.S. PATENT DOCUMENTS

| 4,351,642 A | * | 9/1982 | Bonavent et al. ........... 436/139 |
| 5,082,679 A | | 1/1992 | Chapman |
| 5,348,661 A | | 9/1994 | Hill |
| 5,483,697 A | | 1/1996 | Fuchs |
| 5,909,776 A | | 6/1999 | Stewart et al. |
| 6,102,992 A | | 8/2000 | Berg et al. |
| 6,315,495 B1 | | 11/2001 | Starheim |
| 6,395,417 B1 | | 5/2002 | Frazier |
| 6,405,389 B1 | | 6/2002 | Harty |
| 6,774,802 B2 | * | 8/2004 | Bachinski et al. .......... 340/632 |

* cited by examiner

Primary Examiner—Brent A. Swarthout
Assistant Examiner—George A. Bugg

(57) ABSTRACT

A system is disclosed comprising a flexible tube attached to a reservoir containing a hazardous material neutralizing substance, and possibly pressurized with air or another gas. The tube is routed around the perimeter of a region where one or more hazardous material containers are stored. In the event of a leak that spreads to the perimeter of the tube, the tube material type is so selected to degrade structurally in response to contact with the hazardous material, thereby rupturing and releasing the neutralizing substance stored within the tube and attached reservoir. The neutralizing material used is selected to neutralize the hazardous material released, to mitigate further damage or eliminate the hazard completely, or at least until intervening personnel can arrive. When a perimeter tube is ruptured, the released internal pressure drop may also activate an alarm, that is either audible, or uses a wire or cellular line to contact authorities as concerning the nature of the spill, be it fire or police departments, or maintenance or property personnel. The system can be used without the assistance of electrical power or electronics (or with sources like a lithium battery for the alarm), in an inexpensive package that requires no direct human monitoring, and can be employed in very remote installations.

20 Claims, 2 Drawing Sheets

METHOD OF AUTOMATICALLY MONITORING AND NEUTRALIZING HAZARDOUS MATERIAL SPILLS

This application claims the benefit of provisional patent application No. 60/395,899, Jul. 15, 2002.

BACKGROUND OF THE INVENTION

1. Field of the Invention

The present invention relates to a method of monitoring and neutralizing any spills or leaks of hazardous materials. More specifically, the present invention relates to a multi-component device that automatically detects and responds to leaks emanating from stored hazardous material containers, by applying neutralizing chemicals, and optionally initiating a remote alarm device to notify appropriate emergency or maintenance personnel.

2. Related Art

Chapman (U.S. Pat. No. 5,082,679) discloses a method of detoxifying foodstuffs, by first spraying the food with a wetting agent, then an ammonia gas de-toxicant. The combination gives an exothermic reaction and elevated temperatures that complete the detoxification process at otherwise ambient temperatures. This invention does disclose a multi-step process to raise temperatures and complete the process of neutralizing harmful bacteria and other additives that pose a danger to humans, but it does not address corrosive substances that also threaten equipment, is not automatic in activation, does not detect unanticipated events when they occur, and does not notify personnel that such an event has occurred, nor address a number of hazardous exposure scenarios simultaneously.

Hill (U.S. Pat. No. 5,348,661) discloses a method of absorbing oil spilled on water by use of a porous bladder with absorbent material inside. The bladder is placed on the water/oil surface, and extracts the oil internally until it is significantly captured. It is a means of mitigating a spill, but not for a material that is generating an immediate corrosive or otherwise hazardous condition. This device is not automatic in activation (rather being employed by an operator to be directed to the scene of the spill), does not detect unanticipated events when they occur, and does not notify personnel that such an event has occurred, nor addresses a number of hazardous exposure scenarios simultaneously.

Fuchs (U.S. Pat. No. 5,483,697) discloses an improved surgical glove that features double layers, with a sealing solution present between the layers, to seal any holes or ruptures that occur, to prevent the exposure of biologically (or presumably chemically) hazardous materials being handled from coming into contact with the wearer. While this invention takes action to prevent the contact of a hazardous material by a person, it is only activated with personnel present, it does not disclose special materials to mitigate a wide array of hazardous materials, does not eliminate the hazard from others present or in a permanent manner, and does not notify remote personnel that such an event has occurred, or protect other property from the threat.

Berg et al (U.S. Pat. No. 6,102,992) discloses a method of creating an aerosol of encapsulant material that can be applied to the surface of a hazardous material, which forms a coating or skin on the material surface that can be removed and disposed. The approach does address the mitigation of hazardous materials, but it is not automatic in nature and thus requires the presence of personnel to apply the treatment, it may be limited in the range of hazardous materials that it can successfully encapsulate and mitigate, and does not notify remote personnel that such an event has occurred.

Starheim (U.S. Pat. No. 6,315,495) discloses a system or panels or planks that are assembled to form berms around spills, with a sheet of impervious geocloth attached to the berm to serve as a liner to seal off the spilled area. The approach does control and minimize the damage due to hazardous spills, but it does not automatically detect and implement the mitigation approach, does not address the minimization or elimination of the damage within the perimeter of the berm, requires the presence of personnel to implement the technique on-site, and does not contact personnel remotely that a spill has occurred.

Frazier (U.S. Pat. No. 6,395,417) discloses a liner underneath a battery compartment, filled with a neutralizing material in the liner, and within "containment rails". It may also have a device installed that, when wetted within the base of the liner, shorts a circuit and notifies personnel that a leak event has occurred. The device neutralizes battery acid spills specifically, passively addresses any spills of such acid, and has disclosed some means of notifying personnel that a spill event has occurred. It does not have a provision to provide customized mitigation for a wide array of diverse hazardous materials that may be stored together (each which might need a specific mitigation technique or antidote), requires the leakage to occur in the specific region where the alarm device is located, and requires the ability to store the device directly below the battery location, and can only use mitigation materials that will not evaporate over time when exposed to the environment, and do not pose their own hazard when left exposed to contact by personnel. It also only discloses devices to address battery acid spills specifically.

Harty (U.S. Pat. No. 6,405,389) discloses a deformable container that slips around specific appendages or regions of the body of personnel injured, possibly due to localized exposure to certain hazardous materials, or where their bodily fluids may pose a hazardous threat to other personnel. The flexible device does separate the exposure to other parts of the body, and other personnel, from areas exposed to the hazardous substance. It does not eliminate the hazard itself or mitigate it from damaging the area it has been constrained within, it is not automatically activated, and does not notify personnel that an event has occurred.

Stewart (U.S. Pat. No. 5,909,776) discloses a synthetic polymeric resin tube that is filled and pressurized with a fire extinguishing agent, comprising a thixotropic mixture of dry chemical powders and a liquefied fluorocarbon-based extinguishing chemical. The tube activates by bursting when a heat source such as a flame is applied to it, due to the properties of the tube. The discharged extinguishing mixture extinguishes any flames that might have been the cause of such ruptures. This system is not disclosed as using materials that react when exposed to hazardous chemicals, nor applying materials that mitigate such hazardous spills. It is also not suited for protecting a diverse range of hazardous chemicals at one time.

In summary, it is desired to provide a system that automatically monitors the storage of one or more hazardous material containers to detect leaks, and if so detected, automatically responds by releasing suitable neutralizing substances to provide a first line of defense to minimize assets damaged and hazardous conditions to personnel. Such a system should function automatically without the need for electrical power or other electronics. Additionally, such a system may also notify authorities, when so activated, to alert them to the incident to take more comprehensive measures. No technique has been demonstrated that incorporates these features previously.

SUMMARY OF THE INVENTION

The principle object of the present invention is to provide a method of detecting leaks of hazardous chemicals.

Another object of the invention is to provide a means of applying neutralizing substances in response to such leaks to mitigate damage or hazards presented by the leaking hazardous material.

Another object of the invention is to provide the appropriate neutralizing substance for a wide variety of hazardous materials that are stored together, with each particularly requiring a unique neutralizing substance or technique.

Another object of the invention is to provide such a system that requires no electrical power or other electronics to function automatically, without the assistance of personnel.

Another object of the invention is to provide the ability to notify remotely located personnel that a hazardous material leak and subsequent discharge of neutralizing substances has occurred, via audible alarms or similar means.

Another object of the invention is to absorb any liquid hazardous material leaks that are present.

Another object of the invention is to vacuum any hazardous material spills that occur.

Another object of the invention is to provide a monitoring and protective system for hazardous materials that is portable.

The foregoing objects can be accomplished by providing a system comprising a flexible tube attached to a reservoir containing a hazardous material neutralizing substance, and possibly pressurized with air or another gas. The tube is routed around the perimeter of a region where one or more hazardous material containers are stored. In the event of a leak that spreads to the perimeter of the tube, the tube material type is so selected to degrade structurally in response to contact with the hazardous material, thereby rupturing and releasing the neutralizing substance stored within the tube and attached reservoir. The neutralizing material used is selected to neutralize the hazardous material released, to mitigate further damage or eliminate the hazard completely, or at least until intervening personnel can arrive. Alternatively, bundles of several tubes can be routed, each attached to their own separate reservoir, with each tube housing a neutralizing substance for a particular hazardous material in storage. Tubes may have special outer coatings designed to react with the hazardous material, which will react exothermically upon contact to generate heat, or produce other by-products that weaken the tube and thereby facilitate rupture and the discharge of the tube contents. Tubes may also discharge materials that absorb hazardous materials, or simply be formed of the absorbent material itself, or act as a liquid dam. The tubes may also be attached to a source of vacuum that vacuums any leaks that impinge the tube and rupture it. When a perimeter tube is ruptured, the released internal pressure drop may also activate an alarm, that is either audible, or uses a wire or cellular line to contact authorities as concerning the nature of the spill, be it fire or police departments, or maintenance or property personnel. The system can be used without the assistance of electrical power or electronics (or with sources like a lithium battery for the alarm), in an inexpensive package that requires no direct human monitoring, and can be employed in very remote installations. Thus is described a system that can satisfy all of the objects stated previously, whereas prior art cannot satisfy all of the objects in their entirety.

DETAILED DESCRIPTION

Figure 1:
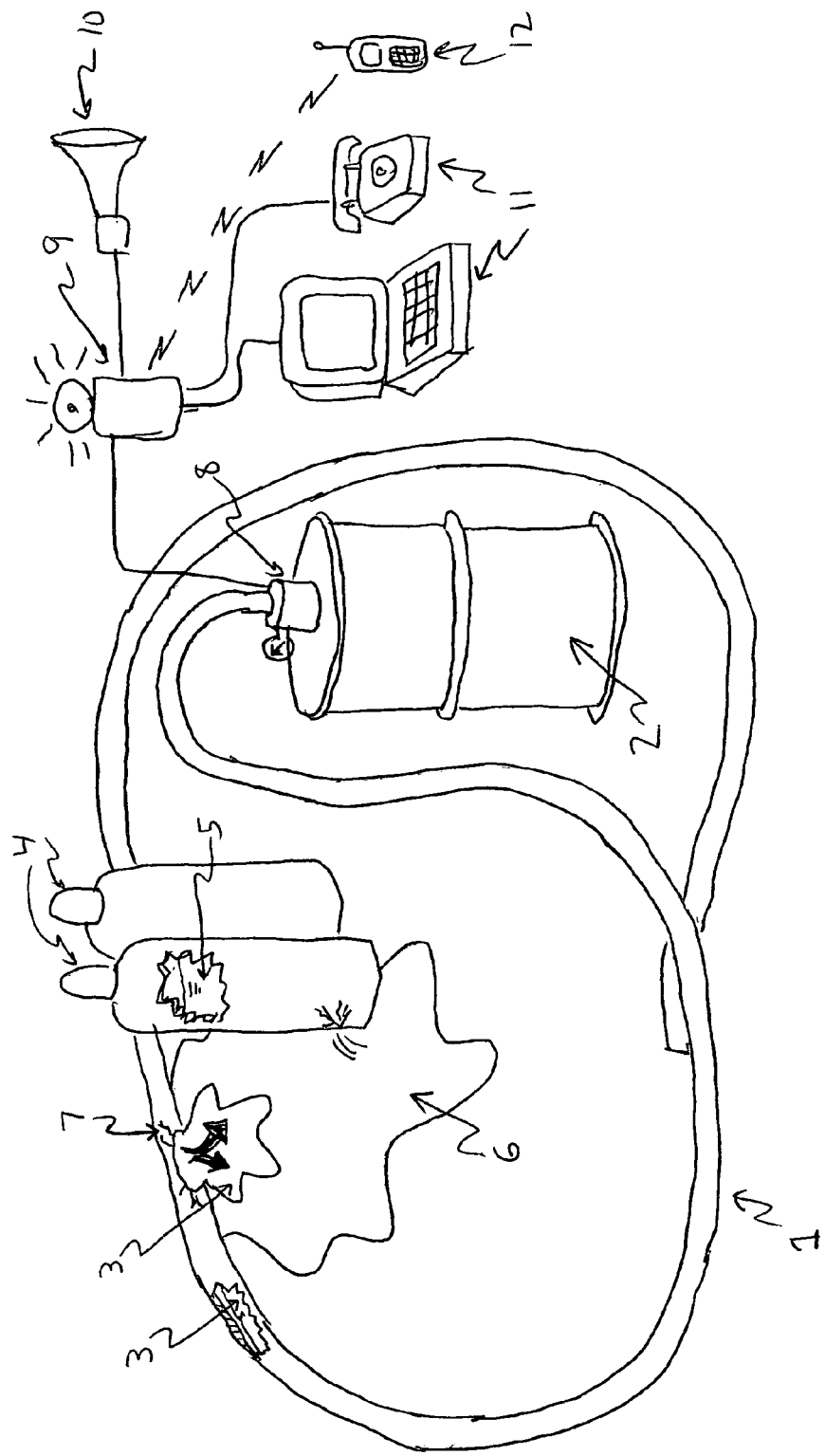
FIG. 1 is a partial cutaway view of the entire system.

Refer to FIG. 1, a partial cutaway view of the entire system. The system comprises a flexible tube 1 attached to a reservoir 2, both components housing a hazardous material neutralizing substance 3 that is stored under pressure by means of a pressurization gas, the hydrostatic pressure of the substance itself, a spring-loaded piston, or other means. The tube 1 is routed to surround one or more canisters 4 containing hazardous materials 5. When the hazardous material leaks and/or spills out as a pool 6 into the surrounding area, thereby creating a corrosive or toxic hazard, the pool 6 eventually impinges upon the tube 1. After exposure to the tube 1 for a limited duration, the pool 6 weakens the tube 1 via a chemical reaction, thereby reducing its ability to withstand the pressure within the tube 1, and resulting in a rupture 7 in the tube 1, releasing the neutralizing substance 3 onto the pool 6. Their interaction thereby renders the hazardous material minimally safe for clean up, or at least for a limited period until appropriate personnel arrive to address the situation. The system may be connected to a device 8 that monitors any loss of pressure in the system (such as due to tube rupture), and then initiates an alarm 9 to notify personnel that a leak or spill has occurred. The device 8 may function in one embodiment by release of a spring-loaded contact that completes an electrical circuit. The alarm 9 may be audible via a speaker 10 to notify local personnel to remedy the mishap, or contact remote personnel via a wired telephone or computer line 11, or a wireless cellular connection 12. In any case, remote maintenance personnel or fire or police departments can be notified of the event in order to respond. The basic system needs no electrical power to function, but a stored power source such as a lithium battery is sufficient for the optional alarm component. Such a system is inexpensive, and can be mounted in remote areas and sites far from personnel. Such a system can be sufficiently compact to be readily portable and installable in ad-hoc fashion anywhere, and even mounted on non-stationary platforms such as automobiles, trucks, aircraft, ships, trailers/shipping containers and powered industrial equipment.

Figure 2:
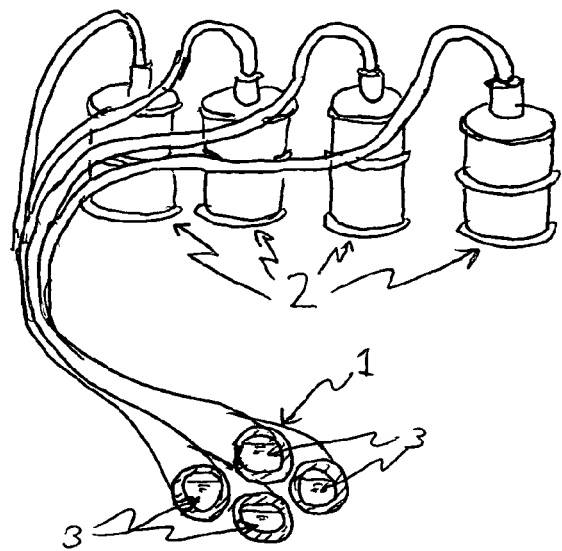
FIG. 2 is a partial cutaway view of a multi-tube/reservoir system.

FIG. 2 is an illustration of a bundle of tubes 1, each of a unique material type selected to respond to an individual hazardous material type among several to be protected. Therefore, a collection of a multiplicity of hazardous materials at a single site can be addressed. In turn, each of these tubes 1 is attached to its own reservoir 2 and filled with a neutralizing substance 3 suited for the hazardous material its tube is designed to react with.

Figure 3:
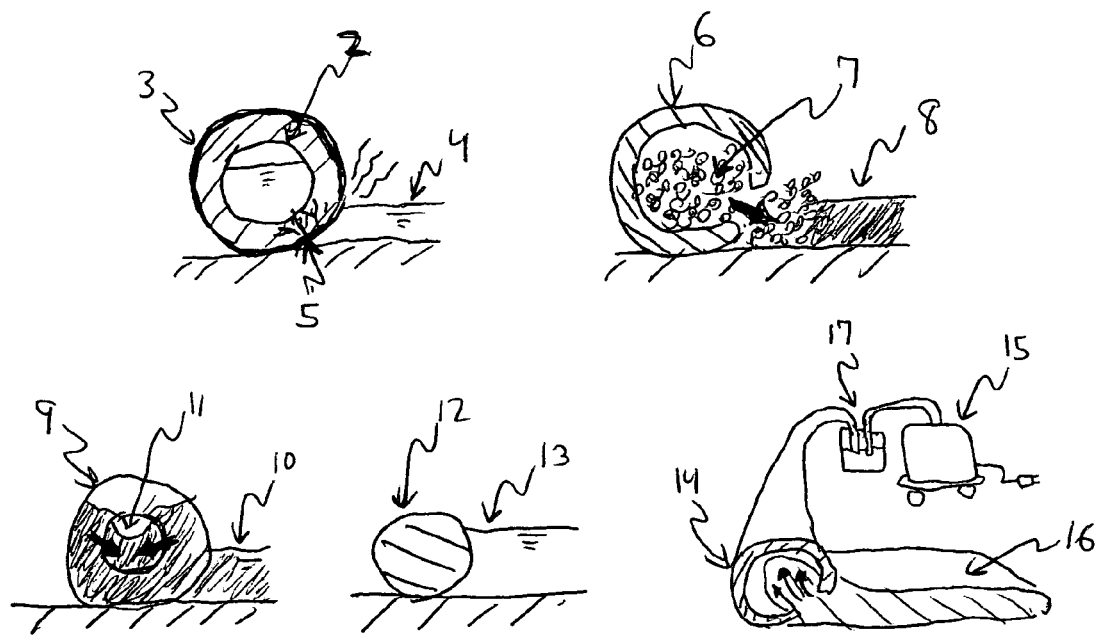
FIG. 3 is a cross-sectional view of tubes that mitigate hazardous materials by various means.

FIG. 3 is a cross section of tubes that can address hazardous materials by various alternative means. One tube 2 has a coating 3 applied to its exterior that is selected to react with a particular impinging hazardous material 4. The reaction either liberates heat or otherwise chemically reacts to weaken the tube 2 (possibly by generating reactants that weaken the tube) and facilitate its rupture 5. Another tube 6, when ruptured, discharges materials 7 that are designed to absorb hazardous materials 8 to prevent their spread. Another tube 9 is made itself of an absorbing material that soaks up the leading edge 10 of the hazardous material spill, and may have a uniform cross section or be hollow in the center, with a cavity 11 designed to trap the spilled hazardous material. Another tube 12 functions merely as a physical dam to prevent the further spread of other hazardous chemicals 13. Another tube 14 may actually be attached to a source of vacuum 15, such as a "wet vac"-type apparatus, that activates when pressure is lost in the tube 14 due to rupture, and the applied vacuum sucks the impinging hazardous material 16 away from the danger area and into an approved collection canister 17. Tubes can also be used that respond to hazardous material vapors as well.

A myriad of tube materials are available that will react with either basic, acidic or other hazardous materials. For example, nylon and its derivatives react with strong oxidizers, acids and alkalis, and even some salts. Silicone tubes will degrade when exposed to sodium hydroxide, concentrated solvents, acids and oils. Various flexible tubing candidate materials include acrylic, silicone, nylon, PVC (poly vinyl chloride), vinyl and polycarbonate, amongst others, with such candidates being either resistant or vulnerable to a wide variety of hazardous materials (with those candidates holding acid neutralizers being selected to be resistant to bases, and vice versa), with all pertinent hazardous materials each having tubing material candidates identified that are both resistant and vulnerable to degradation.

A wide variety of hazardous material mitigating substances are available in the marketplace that are suitable for the tubing and hazardous materials in question. Common acid neutralizing products include calcium carbonate, magnesium oxide and sodium carbonate. Hydrofluoric acid spills can be remediated with calcium gluconate gel. Sodium bisulfate is often used as a base neutralizer. Other materials such as vermiculite and sodium bicarbonate are used to absorb spills, and sodium thiosulfate is used to neutralize bromine spills. Other spill neutralizing materials include phosphoric acid, urea, mono-ammonium phosphate, ammonium polyphosphate, fumeric acid, attapulgite clay, citric acid, perlite, silica and activated carbon. Acid neutralizers in liquid state can include triethanolamine. Zinc and zinc oxide can be used to absorb mercury spills. Nitrogen or air may be used to pressurize these substances in storage, and they may be dissolved or suspended in water or other solvents to aid in dispersal, whether they be liquids or solids in their normal state. For example, some materials are currently applied to spills via use of compressed air sprayers (charged as high as 700 psi) at rates as high as 65 gallons per minute. They may also include additives that result in the creation of a foam head on the liquid surface to prevent the release of hazardous vapors. Depending upon the commercial neutralizing substance and the hazardous material it addresses, one part of the neutralizing substance may neutralize anywhere from 0.86 to 0.073 parts (13.7 to 1 ratio) of various hazardous materials. Solutions that are intended to rinse a surface to remove hazardous materials may also be used, which may include sodium carbonate, trisodium phosphate, calcium hypochlorite, hydrochloric acid and water.

There is thus described novel techniques and features to automatically monitor and neutralize hazardous material spills, which meets all of its stated objectives and which overcomes the disadvantages of existing techniques.

The foregoing description of the preferred embodiments of the invention has been presented for purposes of illustration and description. It is not intended to be exhaustive or limit the invention to the precise form disclosed. Many modifications and variations are possible in light of the above teaching. It is intended that the scope of the invention be limited not by this detailed description, but rather by the claims appended hereto.

I claim:

1. A system to respond to the discharge of hazardous substances, comprising:
   (a) a structure constructed of a material type subject to rupture when exposed to said hazardous substance, and
   (b) a means of mitigating damage to surrounding structures or personnel from exposure to said hazardous substance, applied automatically in the event of said exposure,
   wherein said system has multiple structures and mitigating means to mitigate multiple hazardous substance types.

2. The system of claim 1, further including at least one reservoir containing a neutralizing substance, fixedly attached to said structure.

3. The system of claim 1, further including an alarm to notify personnel in the event of system pressure loss.

4. The system of claim 1, wherein said system is pressurized above ambient pressures.

5. The system of claim 1, further including an exterior coating on said structure that reacts with said hazardous substance to promote the rupture of said structure.

6. The system of claim 1, wherein said means is a neutralizing substance enclosed within said structure that is discharged from said structure to neutralize said hazardous substance.

7. The system of claim 6, wherein said neutralizing substance is at least one from a list of neutralizing substances including calcium carbonate, magnesium oxide, sodium carbonate, calcium gluconate gel, sodium bisulfate, vermiculate, sodium bicarbonate, sodium thiosulfate, phosphoric acid, urea, mono-ammonium phosphate, fumeric acid, attapulgite clay, citric acid, perlite, silica, activated carbon, triethanolamine, zinc, zinc oxide, trisodium phosphate, calcium hypochlorite, hydrochloric acid, ammonium polyphosphate and water.

8. The system of claim 1, wherein said material type is at least one from a list of material types including nylon, silicone, acrylic, poly vinyl chloride, vinyl and polycarbonate.

9. The system of claim 1, wherein said means is at least one from a list of means including absorbing said hazardous substance within said structure, vacuuming said hazardous substance into said structure and said system, and damming the spread of said hazardous substance by said structure to prevent further spread.

10. A system to respond to the discharge of hazardous substances, comprising:
   (a) a structure constructed of a material type subject to rupture when exposed to said hazardous substance, and
   (b) a means of mitigating damage to surrounding structures or personnel from exposure to said hazardous substance, applied automatically in the event of said exposure,
   wherein said means is at least one from a list of means including absorbing said hazardous substance within said structure, vacuuming said hazardous substance into said structure and said system, and damming the spread of said hazardous substance by said structure to prevent further spread.

11. The system of claim 10, further including an alarm to notify personnel in the event of system vacuum loss.

12. The system of claim 10, wherein said system has multiple structures and mitigating means to mitigate multiple hazardous substance types.

13. The system of claim 10, further including an exterior coating on said structure that reacts with said hazardous substance to promote the rupture of said structure.

14. The system of claim 10, wherein said material type is at least one from a list of material types including nylon, silicone, acrylic, poly vinyl chloride, vinyl and polycarbonate.

15. A method of mitigating damage from discharged hazardous substances, comprising:
  a) routing a flexible structure around the perimeter of a storage area, featuring containers of hazardous materials;
  b) connecting said structure to a reservoir; and
  c) installing and pressurizing said connected reservoir and structure with a neutralizing substance for said hazardous substances,
  where, upon impingement of said hazardous substance upon said structure, degradation of said structure occurs, resulting in rupture of said structure and discharge of said neutralizing substance onto said hazardous substance.

16. The system of claim 15, further connecting an alarm to said system that activates upon loss of pressure in said system.

17. The system of claim 15, further including an exterior coating on said structure that reacts with said hazardous substance to promote the rupture of said structure.

18. The system of claim 15, wherein material type of said structure is at least one from a list of material types including nylon, silicone, acrylic, poly vinyl chloride, vinyl and polycarbonate.

19. The system of claim 15, wherein said neutralizing substance is at least one from a list of neutralizing substances including calcium carbonate, magnesium oxide, sodium carbonate, calcium gluconate gel, sodium bisulfate, vermiculate, sodium bicarbonate, sodium thiosulfate, phosphoric acid, urea, mono-ammonium phosphate, fumeric acid, attapulgite clay, citric acid, perlite, silica, activated carbon, triethanolamine, zinc, zinc oxide, trisodium phosphate, calcium hypochlorite, hydrochloric acid, ammonium polyphosphate and water.

20. The system of claim 15, wherein said system has multiple structures and mitigating means to mitigate multiple hazardous substance types.

\* \* \* \* \*